No. 844,711. PATENTED FEB. 19, 1907.
A. H. COOMBS,
MACHINE FOR MAKING CEMENT BUILDING BLOCKS.
APPLICATION FILED AUG. 11, 1906.

10 SHEETS—SHEET 1.

Witnesses
Ray White
Harry R. LeWhite

Inventor
Arthur H. Coombs
By Foree Bain and May
Attys.

No. 844,711. PATENTED FEB. 19, 1907.
A. H. COOMBS.
MACHINE FOR MAKING CEMENT BUILDING BLOCKS.
APPLICATION FILED AUG. 11, 1906.

10 SHEETS—SHEET 2.

Witnesses
Ray White.
Harry R. Little.

Inventor
Arthur H. Coombs
By Foree Bain and May
Attys

No. 844,711. PATENTED FEB. 19, 1907.
A. H. COOMBS.
MACHINE FOR MAKING CEMENT BUILDING BLOCKS.
APPLICATION FILED AUG. 11, 1906.

10 SHEETS—SHEET 5.

Witnesses
Ray White
Harry R. Lublite

Inventor
Arthur H. Coombs
By Forel Bain and May
Attys

No. 844,711. PATENTED FEB. 19, 1907.
A. H. COOMBS.
MACHINE FOR MAKING CEMENT BUILDING BLOCKS.
APPLICATION FILED AUG. 11, 1906.
10 SHEETS—SHEET 6.

Witnesses
Ray White
Harry R. Levlutt

Inventor
Arthur H. Coombs
By Goree Bain and May
Attys

No. 844,711. PATENTED FEB. 19, 1907.
A. H. COOMBS.
MACHINE FOR MAKING CEMENT BUILDING BLOCKS.
APPLICATION FILED AUG. 11, 1906.

10 SHEETS—SHEET 7.

Fig. 7.

Witnesses
Ray G. White
Harry R. LeWhite

Inventor
Arthur H. Coombs
By Foree Bain and May
Attys

No. 844,711. PATENTED FEB. 19, 1907.
A. H. COOMBS.
MACHINE FOR MAKING CEMENT BUILDING BLOCKS.
APPLICATION FILED AUG. 11, 1906.
10 SHEETS—SHEET 8.
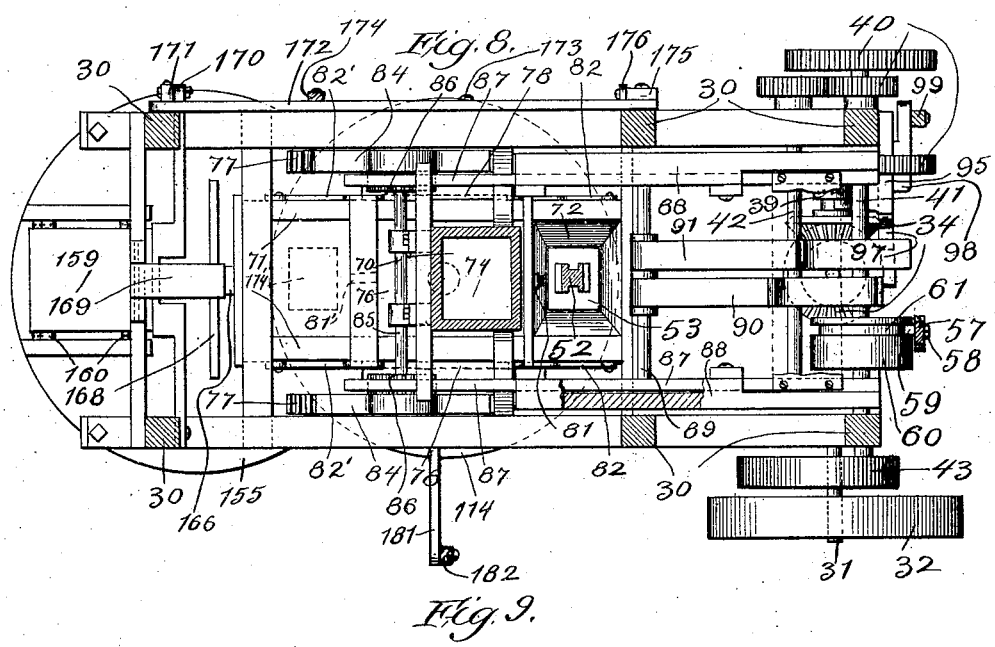
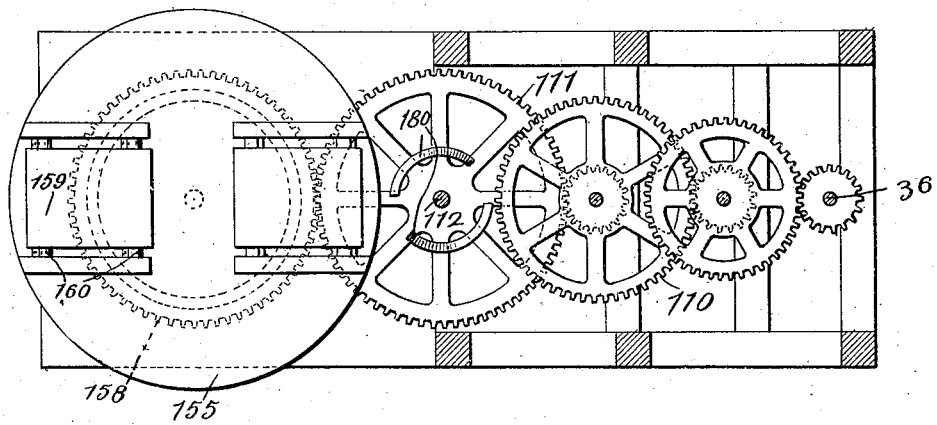
Witnesses
Ray White
Harry R. Luhite
Inventor
Arthur H. Coombs
By Foree Bain and May
Attys.

No. 844,711. PATENTED FEB. 19, 1907.
A. H. COOMBS.
MACHINE FOR MAKING CEMENT BUILDING BLOCKS.
APPLICATION FILED AUG. 11, 1906.

10 SHEETS—SHEET 9.

Witnesses
Ray White.
Harry R. Levlute

Inventor
Arthur H. Coombs
By Foree Bain & May
Attys

No. 844,711. PATENTED FEB. 19, 1907.
A. H. COOMBS.
MACHINE FOR MAKING CEMENT BUILDING BLOCKS.
APPLICATION FILED AUG. 11, 1906.
10 SHEETS—SHEET 10.
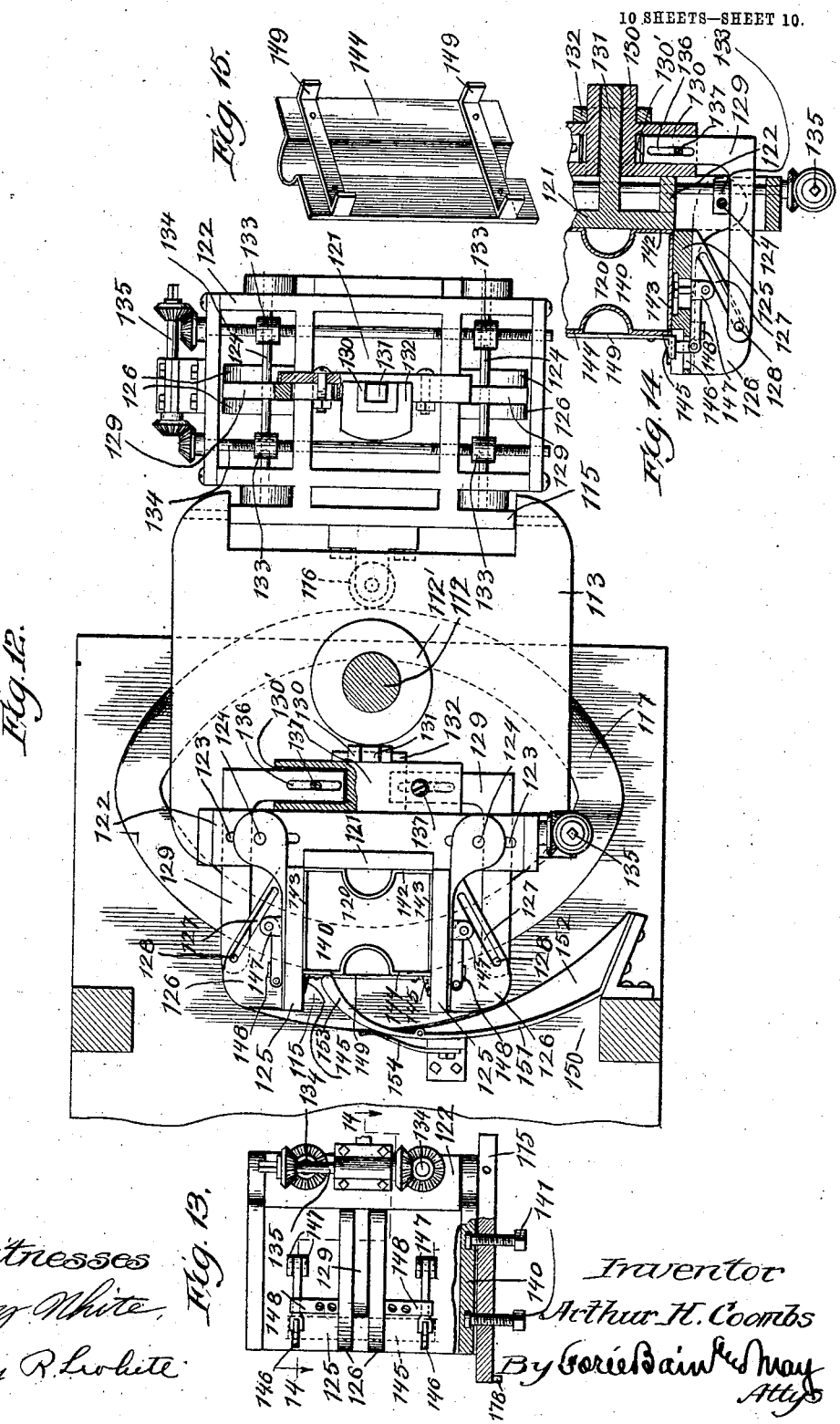

UNITED STATES PATENT OFFICE.

ARTHUR H. COOMBS, OF CHICAGO, ILLINOIS, ASSIGNOR OF ONE-HALF TO OLGA S. COOMBS, OF CHICAGO, ILLINOIS.

MACHINE FOR MAKING CEMENT BUILDING-BLOCKS.

No. 844,711.          Specification of Letters Patent.          Patented Feb. 19, 1907.

Application filed August 11, 1906. Serial No. 330,123.

*To all whom it may concern:*

Be it known that I, ARTHUR H. COOMBS, a citizen of the United States, residing at Chicago, in the county of Cook and State of Illinois, have invented certain new and useful Improvements in Machines for Making Cement Building-Blocks, of which the following is a specification.

My invention relates to improvements in block-forming machines for making cement building-blocks and the like, and has for its object to provide an automatic block-forming machine which will rapidly and successfully perform all of the operations of filling, removing, opening, and restoring block-molds in proper timed relation and under conditions favorable to the production of uniform and satisfactory products.

Herein I have illustrated an embodiment of my invention.

Figure 1:
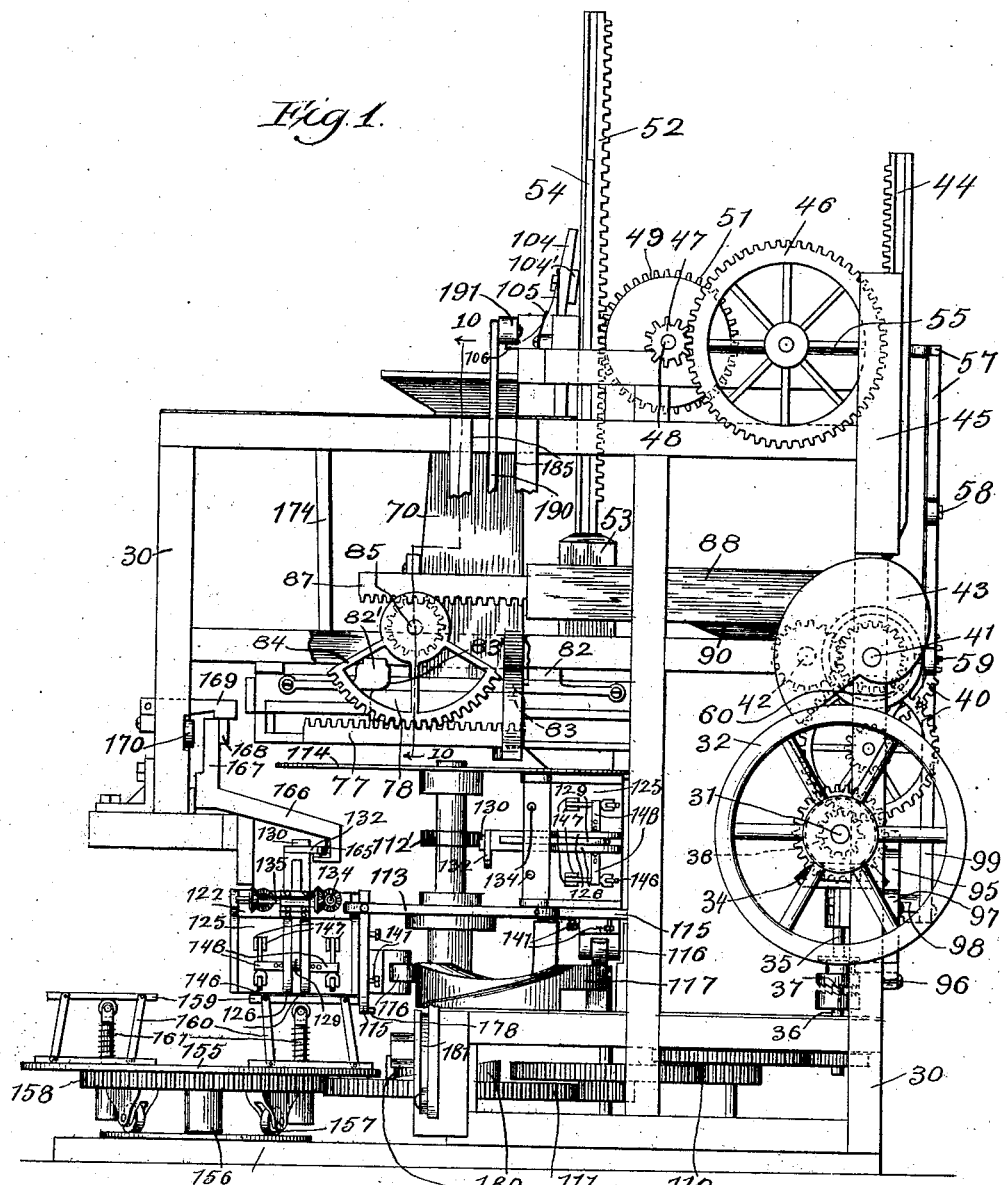
Figure 2:
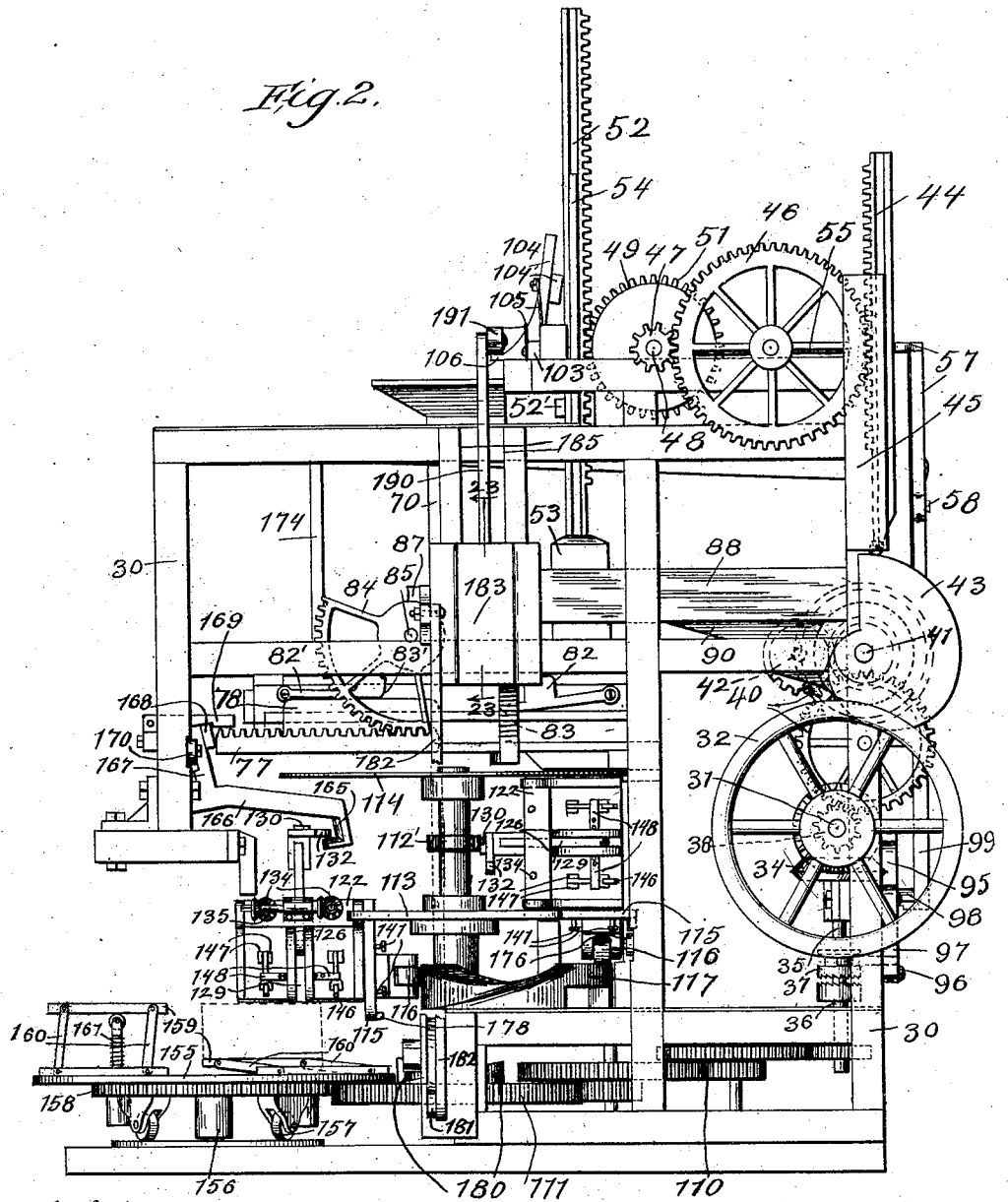
Figure 3:
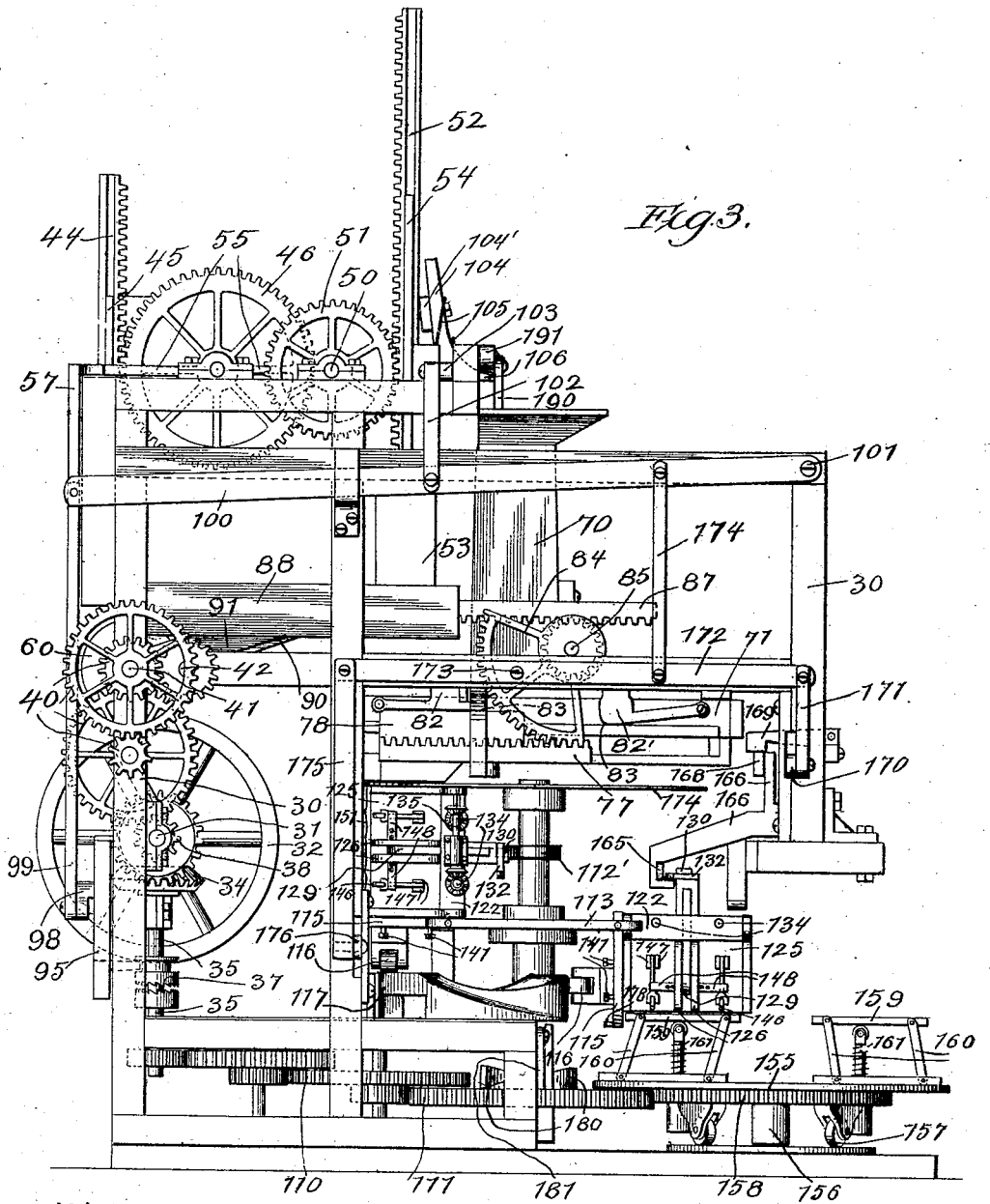
Figure 4:
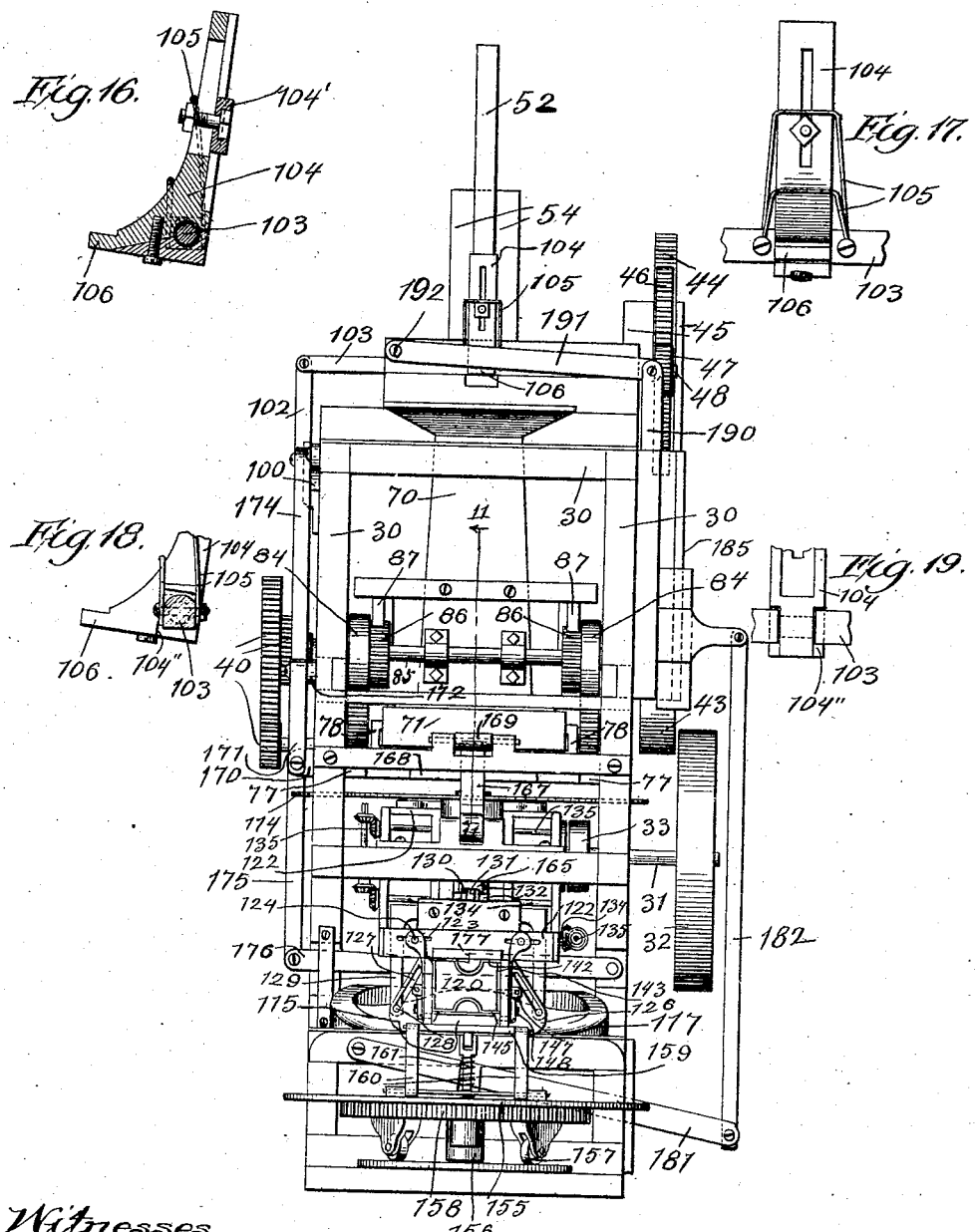
Figure 5:
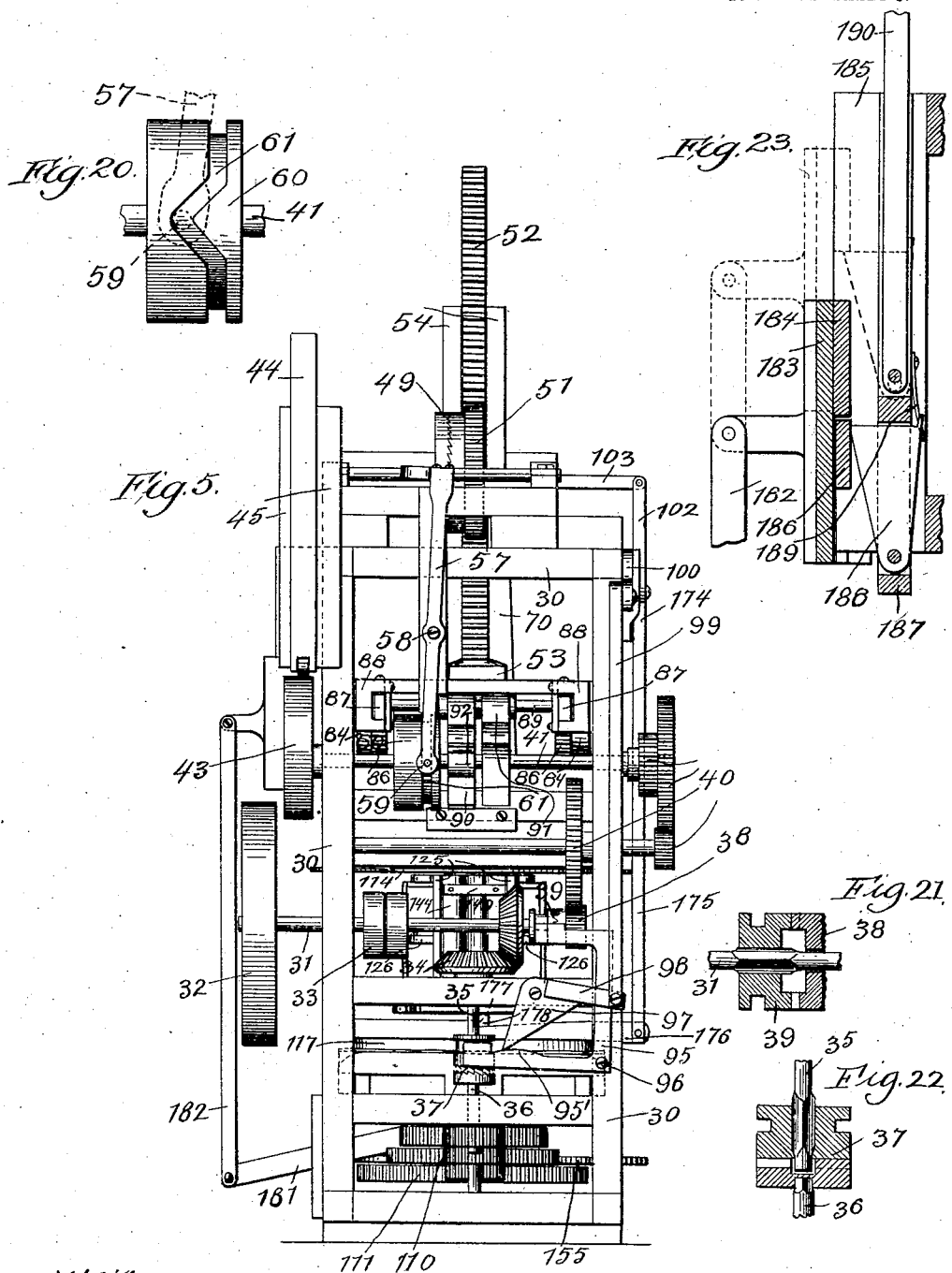
Figure 6:
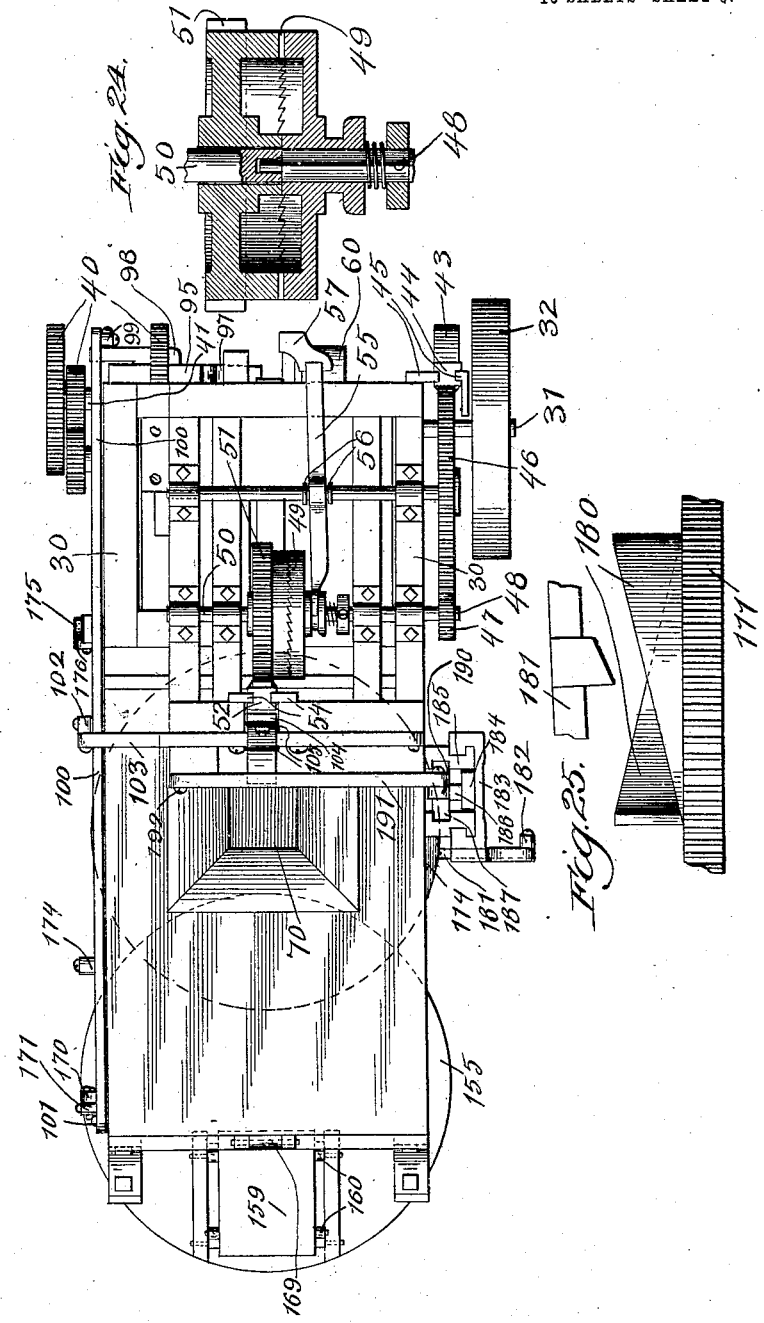
Figure 10:
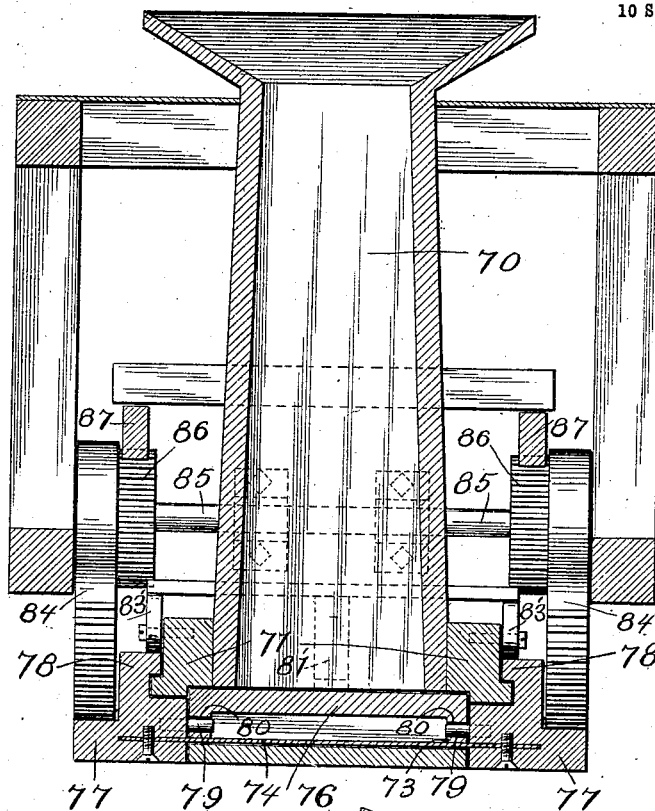
Figure 11:
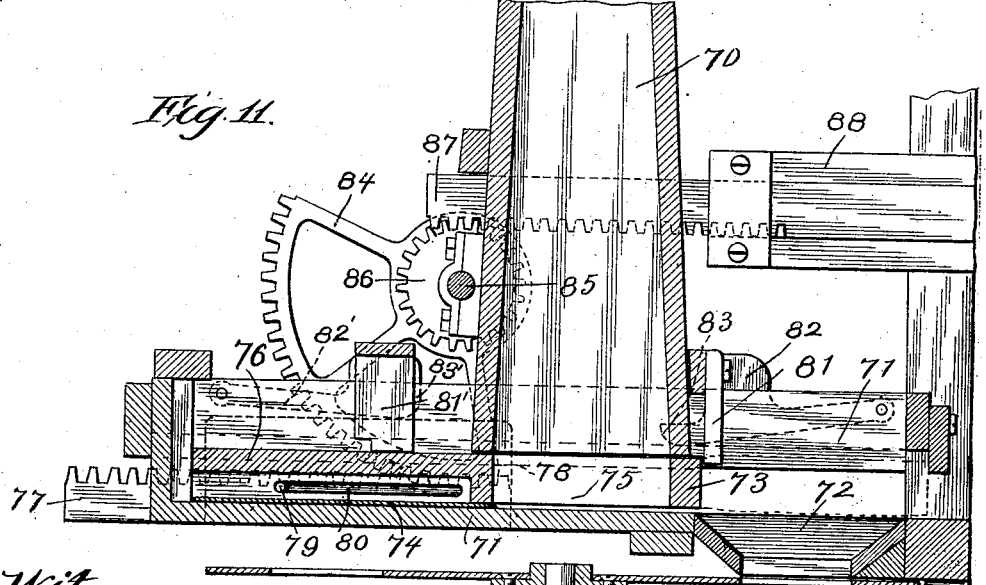

In the drawings, Figure 1 is a side elevation with the material-feeding device in mid-position. Fig. 2 is a similar view with the material-feed device in one extreme of position. Fig. 3 is an elevation from the opposite side with the material-feed device in the other extreme of position. Fig. 4 is a front elevation of the machine. Fig. 5 is a rear elevation. Fig. 6 is a top plan view. Fig. 7 is a longitudinal vertical section. Fig. 8 is a transverse section on line 8 8 of Fig. 7. Fig. 9 is a similar section on line 9 9 of Fig. 7. Fig. 10 is a sectional detail of the feed mechanism on line 10 10 of Fig. 1. Fig. 11 is a longitudinal vertical section of the same devices. Fig. 12 is a section of the front end of the machine, taken just above the mold-carrier. Figs. 13, 14, and 15 are details of construction of the mold and appurtenances. Figs. 16, 17, 18, and 19 are details of a latch device. Fig. 20 is a detail of a clutch-shifting cam. Figs. 21 and 22 are sections of clutches. Fig. 23 is a section on line 23 23 of Fig. 2. Fig. 24 is a detail of a clutch shown in plan in Fig. 6. Fig. 25 is an enlarged detail of a cam construction.

Throughout the drawings like numerals of reference refer always to like parts.

In general my machine provides, in association with a single power-shaft, material-feeding devices for delivering measured quantities of material from a material-reservoir to a properly-positioned mold and evenly distributing said material in the mold, a tamper, timed in respect to the operations of the feed devices, for compacting the fed material in the positioned mold after each feeding operation, and in association with such devices means which operate automatically when the mold is filled to a predetermined or proper degree to disconnect the mold feeding and tamping means from the power-shaft and to connect with the power-shaft hitherto idle instrumentalities which act upon the filled mold. These last-mentioned instrumentalities thus connected with the power-shaft operate to remove the filled mold from filling position and locate it properly to be opened for the delivery of its molded contents and at the same time to position in filling position another hitherto empty mold, in such operation closing the hitherto empty mold, there being provision made for semi-automatically positioning in the mold a pallet-board. At the completion of this divisional cycle of operation the instrumentalities acting upon the filled mold automatically effects a restoration of the power connections initially established, so that the machine may automatically repeat the operations heretofore described with respect to the mold last positioned to be filled. Means are also provided for automatically opening the filled mold at a proper time.

Referring now to the drawings, 30 indicates in general a frame of any suitable configuration wherein the working elements of the machine may be supported in position. For convenience in description I will refer to the end of the machine shown in elevation in Fig. 4 as the "front" end of the machine, the opposite end as the "rear" end of the machine, and the side of the machine, respectively shown in Figs. 1 and 3, as the "right" and "left" sides of the machine. Furthermore, for clearness of description and ease of reference I may particularize as to location of parts in the specific embodiment shown, although it will be understood that changes in location may be readily made in the parts described.

*The power-shaft connections.*—At the rear end of the frame is provided a power-shaft 31, bearing the pulleys 32 and 33 and having connection through miter-gearing 34 with the counter-shaft 35, in vertical alinement with which is arranged a counter-shaft section 36, independent of the shaft 35, but adapted to be connected therewith for rotation through the instrumentality of a suitable clutch 37. (Illustrated in detail in Fig. 22.) The shaft 36 is part of the power system for the mold-moving instrumentalities to be described. Upon the end of the power-shaft 31 toward the left of the machine is loosely mounted a gear 38, adapted to be connected for rotation with the shaft through the instrumentality of a clutch 39. The gear 38 constitutes part of a train of gearing 40, which serves to drive at suitable speed two coincidently but oppositely rotating cam-shafts 41 and 42.

*The tamper structure.*—In the upper portion of the machine is provided a tamper arranged for coöperation with a suitably-positioned mold and means for feeding and distributing material to the mold arranged to be operated in proper timed relation through the instrumentality of cams upon the cam-shafts. 43 indicates a tamper-actuating scroll-cam upon the cam-shaft 41, coöperating with the primary rack-bar 44, arranged for vertical reciprocation in a suitable guide 45, secured to the frame. The cam 43 is preferably of such configuration as to give to the primary rack-bar 44 a quick elevation through its upstroke and a long dwell in elevated position and to then permit its abrupt descent to lowest position under the influence of gravity. With the primary rack-bar 44 meshes a gear 46 in train with a pinion 47, carried by a shaft-section 48, upon which is mounted a movable element of a clutch 49, the remaining element whereof is fixed to a shaft-section 50. The shaft-section 50 alines with shaft 48 and bears a gear member 51, illustrated as an integral part of the fixed clutch member, which meshes with the secondary rack-bar 52, to the lower extremity whereof is secured the tamper 53. Suitable guides 54 are provided for the rack-bar 52 to guide it in vertical movement. It will thus be seen that connection is provided, as long as the clutch 47 is operating, between the primary rack-bar and the secondary rack-bar, whereby the elevation of the primary rack-bar by the cam causes the elevation at a more rapid rate of the secondary rack-bar carrying the tamper. I provide means for operating the clutch 49 to sever the connection between the primary and secondary rack-bars to permit the relatively free descent of the primary and secondary rack-bars at the instant that the cam 43 frees the primary rack-bar for descent. To this end I provide a shipper-lever 55, centrally pivoted, as by loose connection at 56, with the shaft of gear 46 and at its opposite extremities connected, respectively, with the shiftable member of the clutch 49 and with an operating-lever 57. The lever 57 is pivoted, as at 58, and at its lower extremity there is a pin 59, engaging in a cam-slot 61 of a clutch-releasing cam 60 on the cam-shaft 41. The deflected portion of the cam-slot 61 (shown in Fig. 3) is so related to the cam 43 as to open the clutch as the terminal point of the cam 43 passes from beneath the primary rack-bar 44. When the clutch is thus operated, obviously the rack-bars 52 and 44 may descend independently, the rack-bar 44 dropping always the same distance and the rack-bar 52 dropping until it tamps the material in the mold. The elevation of the tamper above the bottom of its preceding stroke is, however, always uniform.

*The feeding mechanism.*—70 indicates a hopper-mouthed reservoir in front of the tamper extending down into a stationary guideway 71, which has at its rear end a hopper-like feed-mouth 72 in the path of descent of the tamper 53 and below which in operation is located the mold to be filled. The lower end of the reservoir 70 is in front of the feed-mouth 72 of the guideway, to be out of alinement therewith. Within the guideway 71 for reciprocation from position in vertical register with the reservoir 70 to position in register with the feed-mouth 72 I provide a material-measuring drawer structure 73 and a distributing-slide 74, these parts being of construction best illustrated in Figs. 10 and 11. The drawer member 73 comprises the drawer proper or pocket 75, from which extends toward the front of the machine a table 76, adapted, when the pocket 75 is moved forward from position of registration with the reservoir 70 to registration with the feed-mouth 72 for the mold, to close the lower end of the reservoir 70. The slide member 74 is a thin sheet of somewhat greater area longitudinally of the machine than the pocket 75 of the drawer structure 73 and is arranged between the bottom of the guide 71 and the said drawer structure to be movable independently of the latter. At its sides the slide 74 extends beyond the drawer structure 73 and is rigidly connected with rack-bars 77, preferably provided with flanges 78, engaging coacting flanges of the side members of guide 71 to receive support therefrom. Lost-motion connection is effected between the slide and the drawer by means of pins 79, carried by the rack-bars 77 and engaging in elongated slots 80 in the side of the table structure 76 of the drawer member. The lost-motion connection is such that as the slide is moved from forwardmost position, Fig. 11, toward the rear of the machine it advances beneath the drawer structure to position to close the lower side of the drawer, and then through engagement of its pins 79 with the ends of slots 80 it carries forward the drawer until both the pocket 75 and slide 74 are above the feed-mouth 72. On the reverse movement the lost motion permits the slide to move back to position shown in Fig. 7, opening communication between pocket 75 and the feed-mouth 72 before the pins 79 engage the forward ends of slots 80 to return the drawer structure to forward position. To hold the drawer structure against being frictionally carried by the slide, I provide a movable stop 81, carried by a lever 82, pivoted to guide 71 and having a nose 83, which is interposed in the path of movement of the rack-flange 78. As shown in Fig. 11, when the drawer structure is forward in normal position the stops 81 hold it positively against movement; but as the pin 79 reaches the rear end of slot 80 the flange 78 lifts the lever-nose 83, elevating the stop and releasing the drawer for movement with the slide. A corresponding stop 81', carried by lever 82', having nose 83', acts in like manner on the forward movement of the slide to restrain movement of the drawer. For moving the rack-bars 77 I provide gear-segments 84, coöperating with said rack-bars 77 and mounted on a common shaft 85, which carries also pinions 86, engaged by rack-bars 87, sliding in suitable guideways 88, provided on opposite sides of the frame and extending rearwardly toward the cam-shaft 42. Connecting the sliding rack-bars 87 is a transverse shaft 89, to which are pivotally connected links 90 and 91, the former having at its rear extremity an open fork coacting with the cam 92 upon the cam-shaft 42, and the link 91, having at its end an oblong loop, with the rear closed end of which coacts a cam 93 upon the cam-shaft 41. These parts are so proportioned and arranged that during the portion of the revolution of the shafts 41 and 42 when the tamper-actuating cam 43 is elevating the tamper 53 to a position clear of the path of the drawer 73 the cams 92 and 93 are both inactive, with the drawer standing in position to register with the feed-reservoir. During a succeeding interval of, say, two-fifths ($\frac{2}{5}$) of the revolution of shaft 41 the cam 92 first rapidly operates upon the fork of its link 90 to throw the rack-bars 97 forwardly of the machine, producing a rearward movement of the drawer and slide, and then the cam 93, rotating in the opposite direction, operates to rapidly pull its associated loop of link 91 and the connected rack-bars 87 toward their rearward limit of movement. Such cam actions are timed to begin just before the tamper-cam 43 lifts the primary rack-bar 44 to highest position and are completed before the "dwell" arc of the tamper-cam passes the said rack-bar. Thus commencement of the movement of the feed-drawer before the tamper quite completes its upstroke is important in the particular disclosure in connection with the mold-opening operations and will be hereafter adverted to.

*The connection-shifting devices.*—The sub-cycle of operation, which consists in the introduction and distribution of material to the mold to be filled and the tamping of each successively-supplied body of material, continues until the mold is filled, and I supply means for automatically disabling the material supplying and tamping means when the mold is filled and at the same time effecting operative connection between the mold-changing elements of the machine and the power devices, which I will now describe. In association with the clutch 37, which, it will be remembered, controls the operative connection of the mold-moving means with the power-shaft, and the clutch 39, which controls the association of the mold-filling means with said power-shaft, I provide a bell-crank shipper-lever 95, controlling both of said clutches and pivoted, as at 96, so that when its lower arm is elevated the clutch 39 is rendered operative and the clutch 37 disabled, while when its lower arm is depressed it renders operative the clutch 37 and disables clutch 39, thus making the operation of said clutches at all times alternative. 97 indicates a double-armed lever, acting like a bell-crank lever, having its one extremity acting upon the double inclined enlargement 95' of the horizontal arm of the double shipper-lever 95 and its opposite extremity acting on the upright arm of the said shipper-lever. An extension 98 is secured to the lever 97, projecting toward the left side of the machine, and the parts are so arranged that when said extension is depressed the actuating-lever 97 acts upon the shipper-lever 95 to press the vertical arm of the shipper-lever toward the left of the machine and elevate its horizontal arm, thereby operatively connecting the elements of clutch 39 and disabling clutch 37, while when said extension 98 is lifted the lever 97 depresses the horizontal arm of the shipper-lever 95, causing the operation of clutch 37 and the disabling of clutch 39. The double incline 95' on the shipper-lever is provided for the purpose of resisting to some extent movement of the lever 97 from its one limit of movement to the other to prevent accidental change of position of the shipper-lever. The extension 98 of the actuating-lever 97 is connected by link 99 with the elongated lever 100, extending along the left side of the frame and pivoted, as at 101, at the front end of the frame, said lever having connected thereto intermediate its ends a link 102, connected with the lever 103, extending transversely across the top of the machine in front of and in proximity to the secondary rack-bar 52 for the tamper. 104 indicates a trip-latch, of construction to be described in detail hereafter, carried by the lever 103 and provided with an adjustable latch-block 104', which is constantly pressed in engagement with the smooth front of the rack-bar 52. Upon the rack-bar is secured a stud or projection 52', (see Fig 2,) which is so located in respect to the latch-block 104' that when a mold is completely filled and the rack-bar thereafter elevated a predetermined distance for another tamping stroke before quite completing its elevation it strikes the block 104' of the latch 104, and, lifting said latch bodily, elevates the lever 103 and through the associated link-and-lever connections 102, 100, 99, 98, and 97 depresses the lower end of the shipper-lever 95, opening clutch 39 to disable the filling mechanism and closing clutch 37 to effect operative connection of the driving-shaft with the shaft-section 36, associated with the mold-changing mechanism to be hereafter described. So far as its operation heretofore described is concerned, the latch member 104 might be simply an adjustable hook pressed in any desired manner against the rack-bar; but to enable said latch to perform a function to be hereafter described I provide a special construction, as illustrated in detail in Figs. 16 and 19. The central portion of the area of lever 103, whereon the latch member 104 is mounted, is made round, as shown in section in Fig. 16, while adjacent the ends of the bearing for the latch 104 the shaft has its upper surface only rounded and its lower corners squared, the latch made with the central bearing part surrounding the round portion of the shaft 98, and adjacent its ends where it coacts with the partly-squared portion of the shaft it is cut away, as shown at 104'', to leave a substantially vertical shoulder for coaction with the squared lower corner of the shaft 103. From the construction shown it will be apparent that the latch member may be to some extent rotated in a direction to press its latch-block 104' against the rack-bar 52 in rear thereof under the influence of a spring 105, but that when sought to be rotated in the opposite direction its vertical shoulder finding bearing against the square lower corner of the shaft 103 will effectually lock the parts together, so that rotation of the latch member in a direction to withdraw the lock 104' from contact with the rack-bar 52 is very limited. The latch member is provided with a nose 106, projecting forwardly toward the front of the machine, which when depressed will occasion the locking of the latch member against rotation to the shaft 103 in the manner heretofore described. Said nose 106 is instrumental in enabling the latch to perform a function hereinafter adverted to.

*The mold-changing mechanism.*—I will now describe the mechanism thrown into activity by the shifting of the clutches in the manner heretofore described. The shaft 36, to which is connected the fixed member of clutch 37, has affixed thereto one element of a multiplying gear-train 110, (best shown in Fig. 9,) which communicates power to a gear-wheel 111, carried by a shaft 112, which extends up to position below the drawer-guide 71 of the feed mechanism and has suitably affixed thereto a mold-carrying table 113, a suitable distance below the feeding-mouth 72, and a disk 114, located immediately below said feed-mouth and provided with two apertures 114'. At diametrically opposite points below apertures 114' of the disk 114 the mold-table 113 is provided with hinged leaves 115, pivoted, as at 116, to the rigid portion of the table, and each bearing a mold of the character to be hereinafter described. Associated with each leaf 115 is a roller 116, arranged to run upon a cam-track 117, which provides a horizontal arcuate surface toward the rear end of the machine, on which the roller 116 may run to maintain the leaf 115 in horizontal position, inclined side surfaces which gradually turn from a horizontal plane to a vertical lower plane, and a vertically-arranged arcuate front surface. The path then provided for the leaf roller-bearings is such that when followed by a roller 116 of a leaf 115 the leaf held horizontal by the roller when its mold is positioned to be filled traverses the rear horizontal arc of the track, is at one side of its path permitted to gradually swing down to vertical position, as illustrated toward the front of the machine in Fig. 7, and continuing its cycle is on the other side of its path restored to the initial horizontal position shown toward the rear of the machine in Fig. 7. In practice the mold-table makes a half-revolution during each cycle of operation.

*The molds.*—The molds (generally indicated at 120 in the drawings) are preferably arranged on end on the respective table-leaves 115. As best shown in Figs. 12 and 15, in the construction of the mold I provide, in association with each table-leaf 115 at right angles thereto, a board 121 and a grille-like frame 122. In suitable slots 123 in the ends of the frame are arranged pivot-rods 124 for wings 125. From each wing 125 extends a fin 126, having therein an inclined slot 127, with which engages a pin 128, carried by an L-shaped member 129, which passes through the open frame 122 and has its angular end inturned and engaged in a recess 130' of a cross-head 130, mounted to slide upon a stud 131, projecting at right angles centrally from the plate 121. 132 indicates a lip projecting from the head 130 for purposes to be described. To provide for relative adjustment of the wings 125 to increase or decrease the distance between them, each pivot-rod 124 has secured thereto connectors 133, to which take shafts 134, each screw-threaded at opposite ends, nut-shafts geared in common to a short actuating-shaft 135, which when rotated communicates its motion to the shafts 134 to cause the connectors 133, and consequently the wing-bearing pivot-rods 124, to approach or recede from each other, as the case may be. To accommodate this adjustment, each of the L- shaped members 129 is slotted, as at 136, for the reception of an adjusting-screw 137, secured in the block 130. The closed lower end of the mold is provided with a facing 140, Fig. 13, adjustable vertically with reference to the filling position of the mold by suitable screws 141 taking through the table-leaf 115, and the side board 121 and face-forming wings 125 are covered by removable facings 142 and 143, respectively. The side of the mold most remote from the axis of rotation of the table is adapted to be closed by a pallet-board 144, abutting against the ends of the facings 143 and engaged by latch members 145, taking through elongated slots 146 in the wings 125 and exteriorly pivoted upon studs 147, which have for adjustment pin-and-slot connection with the wings 125. Springs 148 press the latches 145 constantly inward. It will now be apparent that the mold is adjustable in every direction as to dimensions, though of course in its adjustments the facings are necessarily changed, and on the pallet-board 144 used in forming relatively thin blocks I provide feet 149 for a purpose to be described.

It will be apparent in the construction described that the reciprocation of the cross-head 130 upon the stud 131 respectively away from and toward the frame 122 will, through the members 129 and their pin-and-slot connection with the fins 126 of the face-forming wings 125 of the mold, effect the respective opening and closing of the mold. To insure closing of the mold when in filling position, I so arrange the parts that the end of the cross-head 130 abuts against a flange 112' of the shaft construction 112 when the mold is in filling position.

It will be understood that the mold structure when in filling position completely fills the space between the table 113 and the apron or disk 114 and registers with an aperture 114' in said disk.

For coöperation with the mold I provide semi-automatic means for inserting the pallet-boards 144 in the molds as they move to filling position after having been previously opened.

In the drawings, Fig. 12, 150 indicates in general a pallet-board guide secured to the frame on the left side of the machine and providing a vertical wall 151, a horizontal shaft 152, and a yielding finger 153, pressed by a spring 154. The shelf 152 has its free edge concentric with the rear arc of the track 117, while the wall 151 and finger 153 eccentrically approach the axis of rotation of the mold. When an open mold approaches its closing position, a pallet-board is placed with its edge under the latch 145 of the last-approaching wing 125 and its lower edge resting on the shelf 152. As the mold advances the front free edge of the pallet-board is guided inward by the wall 151 until it nearly reaches the leading wing 125 of the moving mold, while the spring-pressed finger 153 is forced back by said leading wing of the mold. As the mold reaches its final position the finger 153 is passed by the leading mold-wing 125 and snaps inward under its spring tension, striking the free edge of the pallet-board a sharp blow, which drives it into engagement with the latch 145 of the leading wing, completing the preparation of the mold for the filling operation.

*Block-receiving devices.*—For the reception of molded blocks I provide a table 155, mounted for rotation upon a shaft 156 and riding on suitable antifriction-rollers 157, said table being provided on its under side with a gear 158, meshing with the gear 111 and rotating coincidentally therewith, but in the opposite direction. Upon said table are supported platforms 159, secured to the table by parallel links 160 and yieldingly held in elevated position by spring-checks 161 or equivalent devices of suitable construction. The arrangement is such that the links 160 never come quite to a dead-center, so that upon the application of the weight of a block to the normally elevated platform 159 the latter is depressed. The gears 158 and 111 are so meshed that just as a filled mold comes to delivering position and the previously-empty mold arrives at filling position a platform 159 stands directly beneath the filled mold, so that as the mold is opened the contained block upon its pallet-board 144 is deposited upon the properly-positioned platform, which yields inwardly and carries the completed block to the position illustrated in full lines in Fig. 2.

*Mold-opening devices.*—Manifestly the filled mold may best be opened to deposit its contents upon the receiving-platform after the mold-moving parts have come to rest and before the commencement of movement of the mold-moving parts in the succeeding cycle of operation of the machine. I therefore arrange the mold-releasing devices to be operated by mechanism forming part of the mold-filling appliances in order that there may be no delay between the cessation of operation of the mold-moving devices and the renewal of operation of the mold-filling devices.

In the drawings, 165 indicates a hook pivoted at a suitable point in the frame and having its nose 166 arranged when lowered to stand immediately below the position occupied by the lip 132 on the cross-head 130 of the mold positioned to be opened. The hook 165 is provided with an upwardly-extending arm 167, to which is secured a cross-bar 168, which is adapted to stand in the path of movement of the rack-bars 77 for the feed-supplying devices, so that when struck by said rack-bars in their reciprocation the hook 165 is drawn upwardly, as shown in Fig. 2, pulling upon the lip 132 of the crosshead 130 of the mold to open the mold, as heretofore described. For normally holding the cross-bar 168 out of the way of the rackbars 77 I preferably provide a gravity-latch 169, arranged to engage the upwardly-extending arm 167 of the hook to hold it in rearmost position when it is moved to such position, as illustrated in Fig. 2. When in such a latched position, the hook 165 is inoperative; but the latch 169 is arranged for movement to hook-releasing position by instrumentalities operatively connected with the power-changing lever 100.

In the drawings, 170 indicates a lever extending transversely across the front of the machine, pivoted at the right side of the machine, passing under the latch 169 and at its opposite ends connected by a link 171 with one extremity of a lever 172, which is pivoted between its ends, as at 173, and has connected thereto between the pivot-point and the link 171 a link 174, having its upper end attached to the lever 100. Thus when the lever 100 is elevated the latch-releasing lever 170 is likewise elevated to knock the latch 169 out of engagement with the hook, permitting said hook to descend to operating position. To the lever 172, at its end opposite the connection of link 171, is connected a link 175, at its opposite extremity secured to a transverse lever 176, which, as best illustrated in Fig. 5, is provided with a notch 177, which when the lever is raised is engaged by a block 178, carried by the mold-carrying leaf 115 of the mold-table, to prevent rotation of the mold beyond its proper position to be filled.

*The initial connection-restoring devices.—*
It will be apparent that when the filled mold is properly positioned to be opened and an empty mold stands in filling position the subcycle of operations of the mold-changing devices is completed and the machine ready for the restoration of the power connections initially established. To provide for such restoration, I arrange upon the gear-wheel 111, which moves the mold-carrying shaft 112, two segmental cams 180, (see Figs. 9 and 25,) each of which is so shaped and positioned that just at the termination of a half-revolution of the mold-carrying table such cam completes the elevation and permits the subsequent descent of a contact-shoe 181' of a transverse lever 181, (see Fig. 4,) to the outer end of which lever is connected a link 182, extending up along the right side of the machine into engagement with a slide 183, which carries on its inner face a projection 184. The slide 183 coacts with a suitable guide structure 185, having its face toward the slide 183 open, save where said face is traversed by a fixed releasing-bar 186, Fig. 23. In an internal track in the guide 185 works a reciprocating plate 187, in a suitable aperture wherein is pivoted a latch member 188, normally pressed by a spring 199 toward the open face of the guide 185, so that when out of engagement with releasing-bar 186 its nose stands in the path of descent of the projection 184 from the exterior side 183. To the plate 187 is connected a link 190, to the upper extremity whereof is pivoted a transverse lever 191, extending across the machine and pivoted as at 192, so that a central portion of the lever overlies the nose 106 of the latch member 104, heretofore described, as best illustrated in Fig. 4. While the mold-changing devices are in operation the sliding latch 188 of the connection-restoring devices stands elevated, as shown in dotted lines in Fig. 23, while the exterior sliding member 183 stands at its lower limit of its stroke, as shown in full lines in said figure. Now it will be understood that when the subcycle of operation of the mold-moving devices nears completion the lever 181 is elevated by one of the cams 180 lifting the slide member 183 to the position shown in dotted lines in Fig. 23, and just as the subcycle of operations is completed the cam 80 passing from under shoe 181' releases the lever 181, permits the same to drop under the influence of gravity, pulling down the slide 183, the projection 184 whereof now engages the nose of the latch 188, so drawing down the lever 190 and its connected parts until the parts reach the position shown in full lines in Fig. 23, when the latch, striking the releasing-bar 186 of the stationary guide, is pushed over to disengage the projection 184 of the slide and permit subsequent restoration of the plate 187 and latch 188 to raised position when the clutches are next shifted to reapply power to the mold-moving devices. The downward pull upon the link 190, connected with the plate 187 under the conditions above described, depresses lever 191, which acts upon the forwardly-projecting nose 106 of the latch structure 104, heretofore described, tending to tilt such latch structure to throw its elongated arm away from the rack-bar 52. As heretofore described, the possible movement of the latch structure 104 in such direction is extremely limited by the provision of the squared lower shoulder and coacting squared face on the lever 103 and structure 104, so that as soon as said structure 104 binds upon its bar 103 the nose 106 serves as a rigid stop on said bar 103, enabling the lever 191 to depress the lever 103, thereby, through the connection 102, depressing the elongated lever 100 on the left side of the machine. This depression of the lever 100 performs three functions. Through its connections 99 98 97 and clutch-actuating lever 95 it shifts the clutches 37 and 39 to cause clutch 39 to operate and disable clutch 37. Through its connections 174, 172, and 171 it depresses the lever 170, allowing the latch 169 to drop to position for engagement with the hook 165, and through the connections of lever 172 by link 175 with lever 176 it elevates the latter lever so that its notch 177 (see Fig. 5) is interposed in the way of the stop 178 upon the mold-carrying leaf of the mold-table to positively prevent the momentum of said mold-table from carrying it past proper position and to relieve the strain on the shafts and gears.

*The operation of the machine.*—While I have heretofore described the functional operations of some of the individual parts and subcombinations of the machine, I will now give a general description of its complete operation. Assuming the parts to stand in the position illustrated in Fig. 1, with the clutch 39 in operation and the clutch 37 disabled, rotation of the power-shaft 31 supplies power to cam-shafts 41 and 42, rotating the cams 43, 60, 93, and 92. The cam 43 for a succeeding period produces no effect, as the terminal portion of its periphery is concentric; but during this time the cam 92, which is started in operation just before the parts reached the position shown in Fig. 1, presses its connection 90 rearwardly, actuating rack-bars 87 to transmit motion through the segment 84 to the rack-bars 77, carrying the slide 74 of the feed mechanism. As the rack-bars move toward the rear of the machine, the drawer member 75 is held stationary by the latch 81 until the pins 79 complete their traverse of the slot 80 in the drawer, when the front corners of the rack-bar flanges 78′, striking the levers 82, lift the latch 81 to release the drawer structure 73, and at the same time the pins 79, striking the front end of the slots 80, connect the slide and drawer structure for movement together to forward-most position. At the instant that the drawer having the bottom of its pocket 75 now closed by the slide 74 reaches position above the feed-mouth 72 over the mold the latch 81′ drops in front of the drawer structure 73, the cam 92 ceases to operate, and cam 93 commences to act, driving the mechanism for operating the feed-drawer in the opposite direction. Traveling in such forward direction the slide 74 again moves first, while the drawer is held by latching member 81′ until the slide member has completely uncovered the drawer, allowing the material contained in the pocket 75 to drop into the mold in a manner to secure even distribution thereof. As the slide completes its opening of the drawer the latch 81′ is released, permitting the drawer to move back to initial position. Just as this operation is completed the terminal elevated portion of the cam 43 passes from under the prime rack-bar 44, and at the same time the deflected portion of the track 61 operates upon pins 59 of clutch-operating lever 57. In consequence just as the primary rack-bar is permitted to drop back to its lowest position the clutch 49, Fig. 24, is opened, breaking the operative connection between the primary rack-bar and the secondary rack-bar and permitting the elevated tamper 53 to descend under the influence of gravity to compact in the mold the material fed thereto by the feeding devices described. The opening of the clutch 49 is maintained for a comparative instant only, the clutch being then closed by the action of the said cam 60 on the lever mechanism and operative connections being again afforded between the primary rack-bar and the secondary rack-bar, so that the secondary rack-bar is picked up at whatever point its motion may have stopped, so that its subsequent elevation, due to the action of the cam-wheel 43 upon the primary rack-bar, is of predetermined extent irrespective of the condition of the mold. Thus throughout every portion of the mold the material is evenly tamped, so that at each tamping operation the maximum elevation of the tamper-bar is higher with respect to the stationary parts of the machine. Now the scroll portion of the cam 43 acts upon the primary rack-bar and serves to elevate the tamper, and just before the elevation of the tamper is completed the operation of the feeding device is again commenced to feed a subsequent measured quantity of material to the mold. Such operations continue until the mold is completely filled and compacted; but after the last stroke necessary to fill the mold the elevation of the tamper brings the block 52′, carried by the tamper-rack bar, into engagement with the member 104′ of the latch 104, so that the movement of the secondary rack-bar causes the bodily elevation of lever 103, by which the latch 104 is carried, thereby setting in operation the mechanism for varying the power connections and the like. Through the elevation of lever 103, as described, the elongated lever 100 is lifted, and through its link-and-lever connections with the rear end of the machine, operates the belt crank shipper-lever 95 to open the clutch 39 and close the clutch 37, as heretofore described, thereby disabling the feeding and tamper mechanism and throwing into operation the mold-moving mechanism. The same movement of the lever 100 elevates the forward end of lever 172, thereby lifting the releasing-lever 170 of the hook-latch 169 and allowing the hook 165 to drop to lowest position, and the same movement of the lever 172 depresses its rear end, which acts through link 175 upon the mold-positioning lever 176, withdrawing its hook 177, Fig. 5, from engagement with the stop-block upon the leaf of the mold-carrying table and freeing the mold-carrying table for rotation. Now power applied from the driving-shaft 31 to the clutch 37 operates through the gearing connections to rotate the mold-table 113 and the block-receiving table 155. As the shaft 112 is rotated the disk 114 closes the feed-mouth 72, so that no surplus material therein may fall therefrom, and the leaf 115 of the table 113, carrying the filled mold, is allowed to drop to perpendicular position, and as the table completes a half-revolution this filled mold is positioned directly above one of the block-receiving platforms 159 and, with the lip 132 of the sliding cross-head of the mold-operating devices, is brought into engagement with the hook 165 in the position shown in Fig. 3. During the same half-revolution the previously-open mold is slowly brought upon its table into vertical position when at the right side of the machine, having snapped thereinto its pallet-board in the manner heretofore described in detail, and as the table reaches horizontal position having its wings closed by the contact of the cross-head 130 with the flange 112' of the mold-table shaft. As this subcycle of operation is being completed the cam 180 upon the gear 11, which rotates the mold-table, acts through the lever and link 181 182 the latch devices connected therewith and the levers 190 191 upon the nose 106 of the latch device 104, heretofore described, thereby depressing the lever 103 and with it the elongated lever 100. This operation, the reverse of the elevating operation heretofore described, obviously results in a restoration of the original power connections through the disabling of clutch 37 and the connection of the elements of clutch 39, at the same time throwing into operative position the mold-table-checking lever 176 and dropping the hook-latch-releasing lever 170. It will be remembered the originally-mentioned operation of the power connection varying devices occurred just as the cam 43 through its gearing connection elevated the tamper to almost its highest point. Thus it inevitably occurs that such change of power connection takes place after the rack-bars 77 have been moved slightly toward their rearmost position, usually when the rack-bars stand in about a position shown in Fig. 1. Now upon the restoration of the operative connection between the feeding devices and the power-shaft the rack-bars complete their rearward stroke and then swing forward, at the limit of their forward movement striking the cross-piece 168 of the hook 165, moving the cross-piece 168 back to be latched by latch 169 and forcibly lifting the hook proper, which pulls upwardly the cross-head 130 upon the now vertically-disposed stud 131 of the mold, opening the mold in the manner heretofore specifically described. The mold-block, thus freed, is deposited with its pallet-board upon one of the platforms 159, which yields easily against the tension of its check 161, lowering the block out of the way of the mold to the position shown in full lines in Fig. 2, so that upon the next succeeding movement of the mold-changing devices the complete block is carried around to the front of the machine to be lifted off.

While I have herein described in some detail a specific embodiment of my invention for purposes of a full disclosure, it will be apparent that numerous changes in the mechanical construction might be readily evolved by those skilled in the art without departure from the spirit and scope of my invention.

Having thus described my invention, what I claim, and desire to secure by Letters Patent of the United States, is—

1. In a machine of the character described, the combination of a mold, a tamper, a constantly-running power-shaft, a gearing connection between the tamper and the power-shaft, including a releasable element, and means for automatically operating said releasable element in timed relation to a rotation of the shaft.

2. In a machine of the character described, the combination of a mold, a tamper, a constantly-running power-shaft, operating connection between said power-shaft and the tamper, including a releasable element, and means operatively associated with the power-shaft for timing the operation of said releasable element.

3. In a machine of the character described, the combination of a mold, a tamper, a constantly-running power-shaft, operating connection between said shaft and the tamper including a clutch, and a clutch-operating cam on the power-shaft.

4. In a machine of the character described, the combination of a tamper, a constantly-running power-shaft, a cam thereon, a primary rack-bar controlled by said cam, a secondary rack-bar, a tamper carried by the secondary rack-bar, gearing connections between said rack-bars, including a releasable element, and means for automatically operating said releasable element to sever the operating connection between the rack-bars.

5. In a machine of the character described, the combination of a tamper, a constantly-running power-shaft, a cam thereon, a primary rack-bar operated by said cam, a secondary rack-bar, gearing connections between said rack-bars including a clutch, and means for automatically operating said clutch in timed relation to said cam.

6. In a machine of the character described, the combination of a mold, a tamper coacting therewith, means for securing the elevation and descent of the tamper, a material-reservoir, and means for conveying material from the reservoir to the mold and evenly distributing it therein, in proper timed relation to the movements of the tamper.

7. In a machine of the character described, the combination of a mold, a tamper coacting therewith, means for securing the elevation and descent of the tamper, a material-reservoir, a drawer for conveying measured quantities of material from the reservoir to the mold, means for actuating said drawer in proper timed relation to the tamper, and means for evenly distributing the material from the drawer into the mold.

8. In a machine of the character described, the combination of a mold, a tamper, means for securing the elevation and descent of the tamper, material-supply devices for the mold comprising a sliding drawer, means for distributing the material from said drawer into the mold comprising a slide movable to close or open the drawer-bottom, and means for actuating said drawer and slide, timed in relation to the movement of the tamper.

9. In a machine of the character described, the combination of a mold, a material-reservoir, a drawer, a slide forming a movable bottom for said drawer, means for moving said drawer and slide together above the mold and returning the slide in advance of the drawer.

10. In a machine of the character described, the combination with a mold, of material-supply devices comprising a drawer, a slide with lost-motion connection with said drawer, means for moving the slide into and out of register with the drawer and mold, and means for holding the drawer against movement during predetermined portions of each movement of the slide.

11. In a machine of the character described the combination of a mold, a rotary carrier therefor, a feed-mouth wherethrough material may be fed to the mold, and a part apertured at the mold and rotatable with the mold-carrier, for closing said feed-mouth when the mold is removed from register therewith.

12. In a machine of the character described, the combination of a mold, a carrier therefor, rotatable on a vertical axis, a horizontal feed-mouth, and an apertured disk rotatable with the carrier for closing said feed-mouth when the mold is out of register therewith.

13. In a machine of the character described, the combination with a mold movable into and out of position to be filled, mold-filling devices, and means, timed in operation by the mold-filling devices, for removing the mold from filling position when properly filled.

14. In a machine of the character described, a plurality of molds, a carrier therefor, a mold-filling means, and means timed in relation to the mold-filling means, for operating the carrier to remove the filled mold and substitute another.

15. In a machine of the character described, the combination of a closable mold, means for filling and tamping said mold, and means, timed by the mold-filling means, for automatically opening said mold when properly filled.

16. In a machine of the character described, the combination with a mold arranged to be opened, of means for filling and tamping said mold, and means, timed by the mold-filling means, for successively opening and closing said mold.

17. In a machine of the character described, the combination with a mold adapted to be opened, of means for filling said mold, and means timed by said mold-filling means for removing said mold from filling position and opening the mold, and subsequently restoring said mold to filling position in closed condition.

18. In a machine of the character described, a mold, a tamper, means for intermittently feeding material to the mold, and means for actuating said feeding means and tamper to successively supply to the mold a plurality of relatively small charges of material and tamp each charge therein.

19. In a machine of the character described, a mold, a tamper, means for intermittently feeding small bodies of material to the mold and distributing each evenly therein, and means for actuating the tamper after each such feeding and distribution of material to the mold.

20. In a machine of the character described, a mold, a tamper adapted to substantially fill the material-containing space of the mold, means for intermittently feeding relatively small bodies of material to the mold, means for distributing each body evenly throughout the material-containing space of the mold, and means for actuating the tamper to tamp each body of material in the mold after its distribution therein.

21. In a machine of the character described, a mold, mold-filling means comprising a means for feeding material to the mold, a tamper and means for actuating said feeding means and tamper to supply a succession of small charges to the mold and tamp each thereof therein, and means for removing the mold from filling position timed by the mold-filling means.

22. In a machine of the character described, a mold mounted for rotation about a vertical axis extraneous to the mold, a material-reservoir, mold-filling means comprising means for conveying material from the reservoir to the mold, a vertically-reciprocating tamper, and means for alternatively operating the material-conveying means and tamper to supply to and tamp in the mold a succession of charges of material combined with means for rotating the mold on its vertical axis, timed by the mold-filling means.

23. In a machine of the character described, a mold, mold-filling devices, means for moving the mold to and from filling position, means for supplying power to said mold filling and moving means, means for connecting said mold-filling devices with the means of power-supply controlled by the mold-moving devices, and means for connecting said mold-moving devices with the means of power-supply controlled by the mold-filling devices.

24. In a machine of the character described, a power-shaft, a mold, mold-filling devices, a clutch for connecting said mold-filling devices with the power-shaft, means for removing said mold from association with the filling devices, a clutch for connecting said removing means with the power-shaft, means controlled by the filling devices for actuating the second said clutch, and means controlled by the mold-removing means for actuating the first said clutch.

25. In a machine of the character described, power appliances, a mold, mold-filling devices, a clutch for connecting the mold-filling devices with the power appliances, means for removing said molds from association with the filling devices, a clutch for connecting said removing means with the power appliances, a common operating device for said clutches arranged to alternately actuate the clutches, means associated with the mold-filling devices for moving said clutch-actuating devices to connect one clutch, and controlled by the mold-removing devices for actuating the other clutch.

26. In a machine of the character described, a power-shaft, a tamper, vertically-reciprocable means for connecting said tamper with the power-shaft including a reversible element, and means for operating the reversible element to permit the free descent of the tamper, and insure its subsequent elevation a predetermined distance above the terminal point of its previous stroke, a mold, mold-moving means, mold-filling means, clutches for connecting the mold-filling and mold-moving means with the power-shaft, means for automatically actuating said clutches to disable one while the other is operating, said means comprising a lever, a latch carried by said lever coöperating with a part movable with the tamper to operatively move the lever when the mold is filled, and means, associated with the mold-moving devices for actuating the lever when the mold-moving devices have completed their functional operation.

27. In a machine of the character described, the combination of a mold, movable about a vertical axis from filling to discharging position, and hinged on a horizontal axis for oscillation from normal position to a position at an angle thereto, with means for moving the mold about its vertical axis, and means controlling the oscillation of the mold on its horizontal axis, timed to admit of such movement in proper timed relation to its rotation on its vertical axis.

28. In a machine of the character described, the combination of a mold adapted to be opened or closed, mounted for revolution about a vertical axis to be moved to and from filling position, block-receiving means out of vertical alinement with the mold-filling position, means for revolving the mold about its vertical axis, and means for controlling the opening and closing of the mold, for automatically opening the mold in discharging position and closing the same during its return to filling position.

29. In a machine of the character described, mold filling and tamping devices, a shaft, a table carried by said shaft having pivoted leaves, molds carried by said leaves movable by rotation of the shaft into operative association with the mold filling and tamping devices, a means for guiding the mold-carrying leaves, from one plane assumed when in filling position to a plane at an angle thereto in discharging position.

30. In a machine of the character described, mold-filling devices, mold-carrying devices comprising a rotatable table having pivoted leaves, molds carried upon said leaves, and means for raising each leaf to position the mold to be filled and lowering said leaf to position in mold to be emptied.

31. In a machine of the character described, mold-filling devices, including a vertically-reciprocable member, a rotary mold-table provided with a hinged leaf, means for guiding said leaf from horizontal position in alinement with the reciprocable member of the mold-filling devices, to a vertical position remote from the first said position, and a mold, carried by said leaf arranged to deposit its contents from the side which is downward when the table-leaf is in vertical position remote from filling position.

32. In a machine of the character described, a mold provided with hinged wings and a reciprocable head for pivotally moving said wings to open and close the mold, a rotatable table provided with a hinged leaf whereon a mold is mounted, with the free edges of the wing at right angles to the plane of the leaf at the side remote from the axis of rotation, means for rotating the table and means for guiding the leaf, during the rotation of the table from horizontal position at the point where the mold is filled, to a vertical position at a point remote therefrom.

33. A mold of the character described, provided with pivoted wings, forming faces of the mold, and means for simultaneously adjusting the pivotal axes of the wings toward and from each other.

34. In a machine of the character described, a movable mold having pivoted wings, a shaft carrying said mold to and from filling position, and means for moving the wings, arranged when the mold is in filling position for coaction with the shaft to maintain the mold closed.

35. In a machine of the character described, a vertical shaft, means for rotating the shaft, a support upon said shaft, a mold, horizontally pivoted to said support, and provided with movable wings, means for changing the position of the mold on its horizontal axis from vertical to substantially horizontal as the mold is moved from filling position to discharging position, to permit the mold to be opened, and means for moving the mold-wings to closed position, arranged to coact with the vertical shaft during the restoration of the mold to filling position.

36. In a machine of the character described, a vertical shaft, means for rotating the shaft, a support on the shaft, a mold pivoted horizontally on said support, and comprising side wings pivoted along the edges thereof, which are adjacent the vertical shaft when the mold is upright, means for changing the position of the mold from upright in filling position to horizontal in discharging position, and means for opening the side wings, to downwardly discharge the contents of the mold when in discharging position.

37. In a machine of the character described, mold-filling appliances, mold-moving means, a mold associated with said moving means for movement from filling position to position to be opened, said mold being provided with movable parts adapted to open the mold, and means for actuating said movable part associated with the mold-filling means for operation thereby.

38. In a machine of the character described, a movable mold comprising pivoted wings, and means for moving the wings to open and close the mold, means for moving the mold to and from filling position, means for opening and closing the mold, and means for inserting a pallet-board therein between the free edges of the wings.

39. In a machine of the character described, a mold movable about an extraneous vertical axis and pivoted on a horizontal axis, comprising permanent walls constituting three vertical sides of the mold when in filling position, and the fourth open side of the mold being arranged for closure by a pallet-board, means for moving the mold about its vertical axis, means for guiding the mold from vertical position to angular position and back to vertical, in a cycle of rotation thereof about its vertical axis, and means for inserting a pallet-board to close the open side of the mold during its movement from angular to vertical position.

In testimony whereof I hereunto set my hand in the presence of two witnesses.

ARTHUR H. COOMBS.

In presence of—
  FORÉE BAIN,
  MARY F. ALLEN.